(12) United States Patent
Blecher et al.

(10) Patent No.: US 7,734,711 B1
(45) Date of Patent: Jun. 8, 2010

(54) BLADE SERVER INTERCONNECTION

(75) Inventors: Joseph M. Blecher, San Jose, CA (US);
Carl E. Hess, Los Altos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 1288 days.

(21) Appl. No.: 11/120,333

(22) Filed: May 3, 2005

(51) Int. Cl.
*G06F 15/16* (2006.01)
(52) U.S. Cl. ...................... 709/208; 709/238
(58) Field of Classification Search .................. 709/223, 709/208
See application file for complete search history.

(56) References Cited

U.S. PATENT DOCUMENTS

| | | | |
|---|---|---|---|
| 6,986,018 B2 * | 1/2006 | O'Rourke et al. | 711/213 |
| 7,328,267 B1 * | 2/2008 | Bashyam et al. | 709/227 |
| 2004/0024831 A1 * | 2/2004 | Yang et al. | 709/208 |
| 2006/0136704 A1 * | 6/2006 | Arendt et al. | 713/2 |

OTHER PUBLICATIONS

Edwin Mier, Rob Smithers, Tom Scavo, "Gigabit Ethernet Switches", Jan. 26, 1998, p. 1-6.*
Wiley, "Network Interface Card", in Dictionary of Communications Technology Terms, Definitions, and Abbreviations. 1998, p. 1.*
Scott Lowe, "How to Configure Multiple Network Adapters in Windows 2000 Server", Sep. 17, 2002. p. 1-9.*

* cited by examiner

*Primary Examiner*—Vivek Srivastava
*Assistant Examiner*—Ryan J Jakovac
(74) *Attorney, Agent, or Firm*—Luedeka, Neely & Graham, P.C.

(57) ABSTRACT

A computing system having at least one cluster. Each cluster has only one master server. The master server has at least one general processing unit, a relatively high speed data input adapted to send and receive data, a relatively low speed data input adapted to send and receive data, and a buffer memory adapted to buffer data between the relatively high speed data input and the relatively low speed data input. Each cluster also has at least one slave server, which has at least one general processing unit, and a relatively low speed data input adapted to send and receive data, the relatively low speed data input having data communication with the relatively low speed data input of the master server. In this manner, the relatively high speed data input, which tends to be very expensive, is present only in the master server, and is used for the high speed transfer of large amounts of data. However, the master server sends the data out to the slave servers on lower speed connections. Thus, there is a blend of both high speed and low speed data communication within the system, and the data is economically processed in clusters within the system.

20 Claims, 1 Drawing Sheet

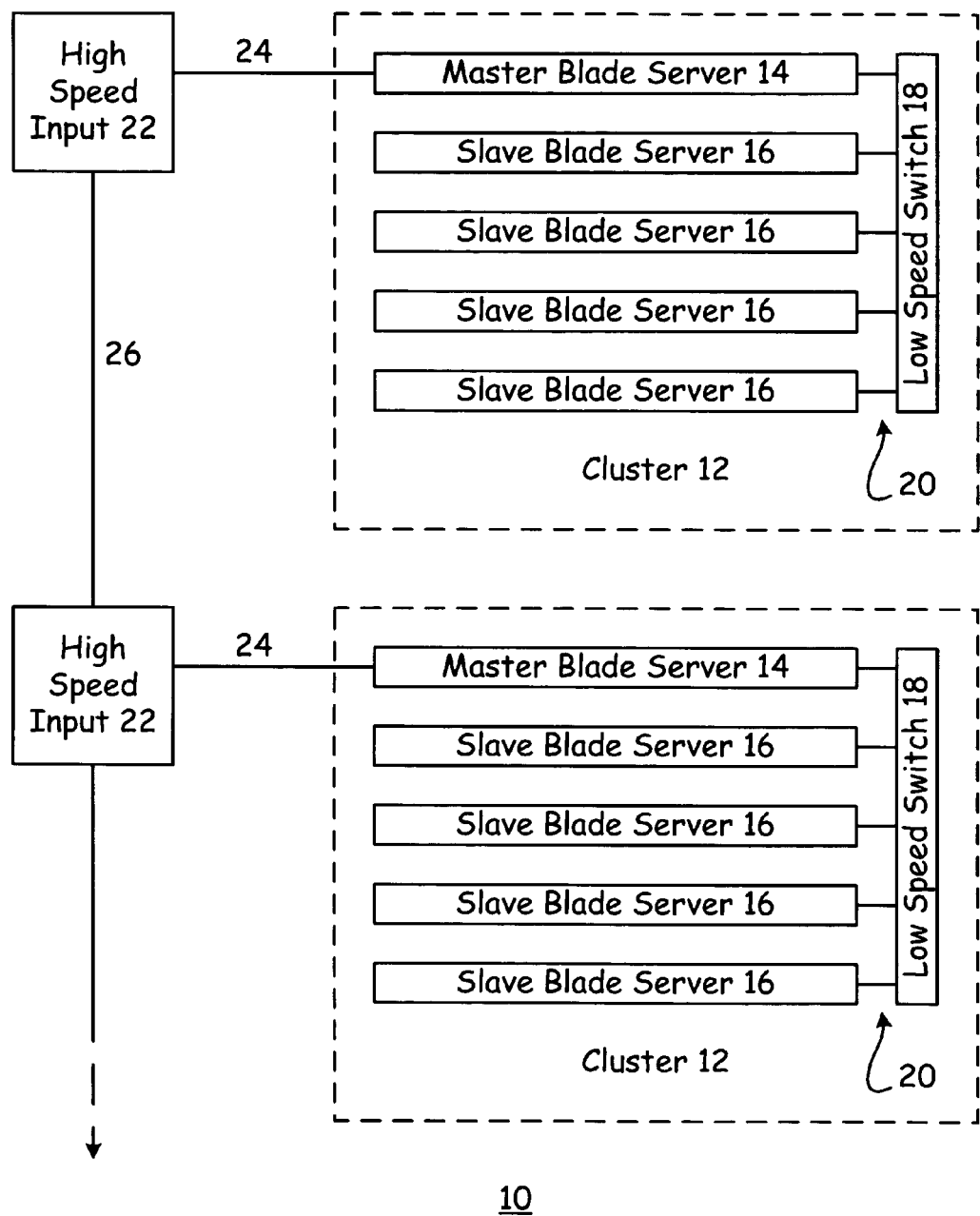

BLADE SERVER INTERCONNECTION

FIELD

This invention relates to the field of integrated circuit fabrication. More particularly, this invention relates to substrate inspection systems.

BACKGROUND

Integrated circuit manufacturers use inspection systems to detect anomalies, such as defects, in substrates. Generally, an inspection system rasters the surface of the substrate with one or more optical sensors, and generates image data based on the images detected by the sensors. This image data is analyzed according to one or more of a variety of different algorithms to determine where defects might exist on the substrate. Integrated circuit manufacturers demand that such inspection systems meet several criteria. Among these criteria is that the inspection system must be extremely accurate, fast, and reliable. Further, such inspection systems should preferably be reasonably priced and relatively flexible.

Prior art inspection systems have implemented one or both of pipelined systems or computers that are networked in a switched fabric topology, which use highly customized hardware. Customized hardware has several disadvantages as compared to commercially available hardware, including higher nonrecurring engineering costs for the developer, lower reliability, longer development times, and more inflexibility in changing algorithms. Switched fabric systems have additional disadvantages, including high cost, lack of standards between manufacturers, and development lag in the components, such as the level of microprocessor that is built into such systems.

Previous approaches to these problems have provided just one of either relatively high bandwidth or relatively low bandwidth interconnects between all of the processors of a system. The relatively high bandwidth approaches can work, but may be more expensive than necessary. The relatively high speed data interconnect in a supercomputer can be a significant portion of the overall system cost. For some applications, exclusive use of a relatively high speed interconnect is excessive. Examples of relatively high bandwidth networks include the SKY and Mercury computer system computers with SKY channel, Infiniband, Race++, or RAPIDIO interconnections.

Relatively low bandwidth approaches may be insufficient to handle the bandwidth requirements of the desired applications. An example of a relatively low bandwidth interconnect is a Linux cluster based around the BEOWULF strategy, with a simple 100 base-T Ethernet interconnect fabric. The old techniques either provide insufficient interconnect bandwidth to successfully complete the problem, or supply an excessive amount of interconnect bandwidth at too great a cost What is needed, therefore, is a system that overcomes problems such as those described above, at least in part.

SUMMARY

The above and other needs are met by a computing system having at least one cluster. Each cluster has only one master server. The master server has at least one general processing unit, a relatively high speed data input adapted to send and receive data, a relatively low speed data input adapted to send and receive data, and a buffer memory adapted to buffer data between the relatively high speed data input and the relatively low speed data input. Each cluster also has at least one slave server, which has at least one general processing unit, and a relatively low speed data input adapted to send and receive data, the relatively low speed data input having data communication with the relatively low speed data input of the master server.

In this manner, the relatively high speed data input, which tends to be very expensive, is present only in the master server, and is used for the high speed transfer of large amounts of data. However, the master server sends the data out to the slave servers on lower speed connections. Thus, there is a blend of both high speed and low speed data communication within the system, and the data is economically processed in clusters within the system.

In various embodiments the system includes multiple clusters, where the relatively high speed data inputs have data communication one to another. In some embodiments the relatively high speed data input has a speed that is at least about twice that of the relatively low speed data input. The relatively high speed data input preferably has a speed of about two and one-half gigabits per second, and the relatively low speed data input preferably has a speed of about one gigabit per second. The relatively high speed data input is, in various embodiments, at least one of serial front panel data port, Infiniband, RapidIO, standard front panel data port, Firewire, and other forms of Ethernet. The relatively low speed data input may be gigabit Ethernet.

In some embodiments, control elements operate within the master server and partition data received on the relatively high speed data input, and send the partitioned data to the slave servers on the relatively low speed data input in at a rate and in partition sizes that do not overload either the relatively low speed data input or the slave servers. In some embodiments a master controller sends data through the relatively high speed inputs to multiple clusters, where the master controller sends the data to the multiple clusters as either mirrored data or partitioned data.

BRIEF DESCRIPTION OF THE DRAWING

Further advantages of the invention are apparent by reference to the detailed description when considered in conjunction with the figure, which is not to scale so as to more clearly show the details, wherein like reference numbers indicate like elements, and which depicts a functional block diagram of a system according to a preferred embodiment of the invention.

DETAILED DESCRIPTION

The embodiments described herein employ a cluster concept, where a relatively high bandwidth network is provided to a master processor or blade server (preferably with memory buffer) within a cluster, and then a relatively low bandwidth network (and commensurately relatively less expensive) is provided to the slave processors or blade servers within the cluster. The concept is extendable to as many clusters as may he needed for the required computing power. The number of slave blade servers that can exist in an individual cluster is preferably limited only by the ability of the master blade server within the cluster to provide data to the slaves using the relatively lower bandwidth network.

The overall system 10 is depicted in the figure. The master blade server 14 has a relatively high bandwidth network connection 24 to a high speed input 22. The master 14 is preferably configures to buffer the high bandwidth data stream and source the necessary components of the data to the slave blade servers 16 within a given cluster 12 over a relatively lower bandwidth network 20, such as implemented through a relatively low speed switch 18. For example, the relatively high speed network 24 in one embodiment is serial front panel data port (Serial FPDP) operating at about two and one-half gigabits per second, but may also include, for example, Infiniband, RapidIO, standard FPDP, Firewire, and other forms of Ethernet. The relatively lower bandwidth network 20 is preferably gigabit Ethernet connected using a gigabit Ethernet switch 18 which may, if desired, use port bonding.

In one preferred embodiment, the relatively high speed network 24 is at least about twice as fast as the relatively low speed network 20. In this manner, there tends to be a sufficient difference in speed between the networks as to afford some cost savings by using networks with two different speeds. Further, the relatively low speed network 20 is preferably at least about one gigabit in speed. Speeds of less than this for the relatively low speed network 20 tend to be too slow for the applications contemplated herein.

The master blade server 14 will preferably provide only that amount of data to each one of the slaves 16 that the slave 16 can process in the appropriate amount of time. If the cluster 12 grows too large, or in other words if there are too many slaves 16 within the cluster 12, then the master 14 will not be able to provide the data at the appropriate rate over the relatively low bandwidth network 20. In this case, the more appropriate action is to create another cluster 12, rather than to grow the size of the initial cluster 12. The additional cluster 12 can then take over its share of the processing load, thereby reducing the bandwidth requirement within the first cluster 12. A relatively high speed network connection 26 is preferably provided between the masters 14 of the two or more different clusters 12.

This relatively high speed network 24 and 26 can either mirror the data stream to two or more of the clusters 12, or can be a high speed fabric such as Infiniband or RapidIO to provide the necessary bandwidth. The computing system 10 may also include a master controller, either centralized or distributed such as in one or more of the elements 22, for sending data through the relatively high speed network 24, 26 to multiple clusters 12, where the master controller sends the data to the multiple clusters 12 as either mirrored data or partitioned data This approach allows the use of very cost effective blade servers 14 and 16 in a supercomputer application, with a relatively high speed network 24 and 26 between clusters 12 and a relatively low speed network 20 within a cluster 12. Current blade servers typically have two processors per box. Preferably, about eighty of such blade servers are interconnected in the preferred embodiments. Putting an interconnect card for the relatively high speed network into each blade server would almost double the cost of each blade server, adding many tens of thousands of dollars to the overall system cost. By mixing the network bandwidth in the manner described herein, a lowest system cost is realized without unduly sacrificing overall system computational bandwidth.

It is appreciated that in the embodiments described above, the slaves 16 do not have a relatively high speed data input like the master 14. Thus, the master 14 and the slaves 16 are configured differently. If the slaves 16 included relatively high speed data inputs, then they would cost just as much as the master server 14. Further, there would be no sense in using the relatively low speed data input on the slaves 16, if they also had a relatively high speed data input.

The masters 14 preferably include control elements for partitioning data, such as image data, that is received on the relatively high speed data input, and also for sending the partitioned data in sequential swaths to the slave servers 16 on the relatively low speed data input 20 at a rate and in partition sizes that do not overload either the relatively low speed data input 20 or the slave servers 16.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computing system comprising:
    at least one cluster, having,
        only one master server, having,
            at least one general processing unit,
            a relatively high speed data input adapted to send and receive data,
            a relatively low speed data input adapted to send and receive data, and
            a buffer memory adapted to buffer data between the relatively high speed data input and the relatively low speed data input, and
        at least one slave server, having,
            at least one general processing unit, and
            a relatively low speed data input adapted to send and receive data, the relatively low speed data input having data communication with the relatively low speed data input of the master server.

2. The computing system of claim 1 comprising multiple clusters, where the relatively high speed data inputs have data communication one to another.

3. The computing system of claim 1, wherein the relatively high speed data input has a speed that is at least about twice that of the relatively low speed data input.

4. The computing system of claim 1, wherein the relatively high speed data input has a speed of about two and one-half gigabits per second.

5. The computing system of claim 1, wherein the relatively low speed data input has a speed of about one gigabit per second.

6. The computing system of claim 1, wherein the relatively high speed data input is at least one of serial front panel data port, Infiniband, RapidIO, standard front panel data port, Firewire, and other forms of Ethernet.

7. The computing system of claim 1, wherein the relatively low speed data input is gigabit Ethernet.

8. The computing system of claim 1, further comprising control elements operating within the master server for partitioning data received on the relatively high speed data input and sending the partitioned data to the slave servers on the relatively low speed data input in at a rate and in partition sizes that do not overload either the relatively low speed data input or the slave servers.

9. A computing system comprising:
    at least one cluster, having,
        only one master server, having,
            at least one general processing unit,
            a relatively low speed data input adapted to send and receive data, wherein the relatively low speed data input has a speed of about one gigabits per second, a relatively high speed data input adapted to send and receive data, wherein the relatively high speed data input has a speed that is at least about twice that of the relatively low speed data input, and a buffer memory adapted to buffer data between the relatively high speed data input and the relatively low speed data input, and at least one slave server, having, at least one general processing unit, and a relatively low speed data input adapted to send and receive data, the relatively low speed data input having data communication with the relatively low speed data input of the master server.

10. The computing system of claim 9 comprising multiple clusters, where the relatively high speed data inputs have data communication one to another.

11. The computing system of claim 9, wherein the relatively high speed data input has a speed of at least about two and one-half gigabits per second.

12. The computing system of claim 9, wherein the relatively high speed data input is at least one of serial front panel data port, Infiniband, RapidIO, standard front panel data port, Firewire, and other forms of Ethernet.

13. The computing system of claim 9, wherein the relatively low speed data input is gigabit Ethernet.

14. The computing system of claim 9, further comprising control elements operating within the master server for partitioning data received on the relatively high speed data input and sending the partitioned data to the slave servers on the relatively low speed data input in at a rate and in partition sizes that do not overload either the relatively low speed data input or the slave servers.

15. A computing system comprising:

at least one cluster, having, only one master server, having, at least one general processing unit, a relatively high speed data input adapted to send and receive data, wherein the relatively high speed data input is at least one of serial front panel data port, Infiniband, RapidIO, standard front panel data port, Firewire, and other forms of Ethernet, a relatively low speed data input adapted to send and receive data, wherein the relatively low speed data input is gigabit Ethernet, and a buffer memory adapted to buffer data between the relatively high speed data input and the relatively low speed data input, and at least one slave server, having, at least one general processing unit, and a relatively low speed data input adapted to send and receive data, the relatively low speed data input having data communication with the relatively low speed data input of the master server.

16. The computing system of claim 15 comprising multiple clusters, where the relatively high speed data inputs have data communication one to another.

17. The computing system of claim 15, wherein the relatively high speed data input has a speed that is at least about twice that of the relatively low speed data input.

18. The computing system of claim 15, further comprising control elements operating within the master server for partitioning data received on the relatively high speed data input and sending the partitioned data to the slave servers on the relatively low speed data input at a rate and in partition sizes that do not overload either the relatively low speed data input or the slave servers.

19. The computing system of claim 15, further comprising control elements operating within the master server for partitioning image data received on the relatively high speed data input and sending the partitioned image data in sequential swaths to the slave servers on the relatively low speed data input in at a rate and in partition sizes that do not overload either the relatively low speed data input or the slave servers.

20. The computing system of claim 15, further comprising a master controller for sending data through the relatively high speed inputs to multiple clusters, where the master controller sends the data to the multiple clusters as either mirrored data or partitioned data.

* * * * *